Nov. 6, 1956
G. L. HELLER
2,769,692
CARBON BLACK PROCESS AND APPARATUS
Filed May 6, 1952
2 Sheets-Sheet 1
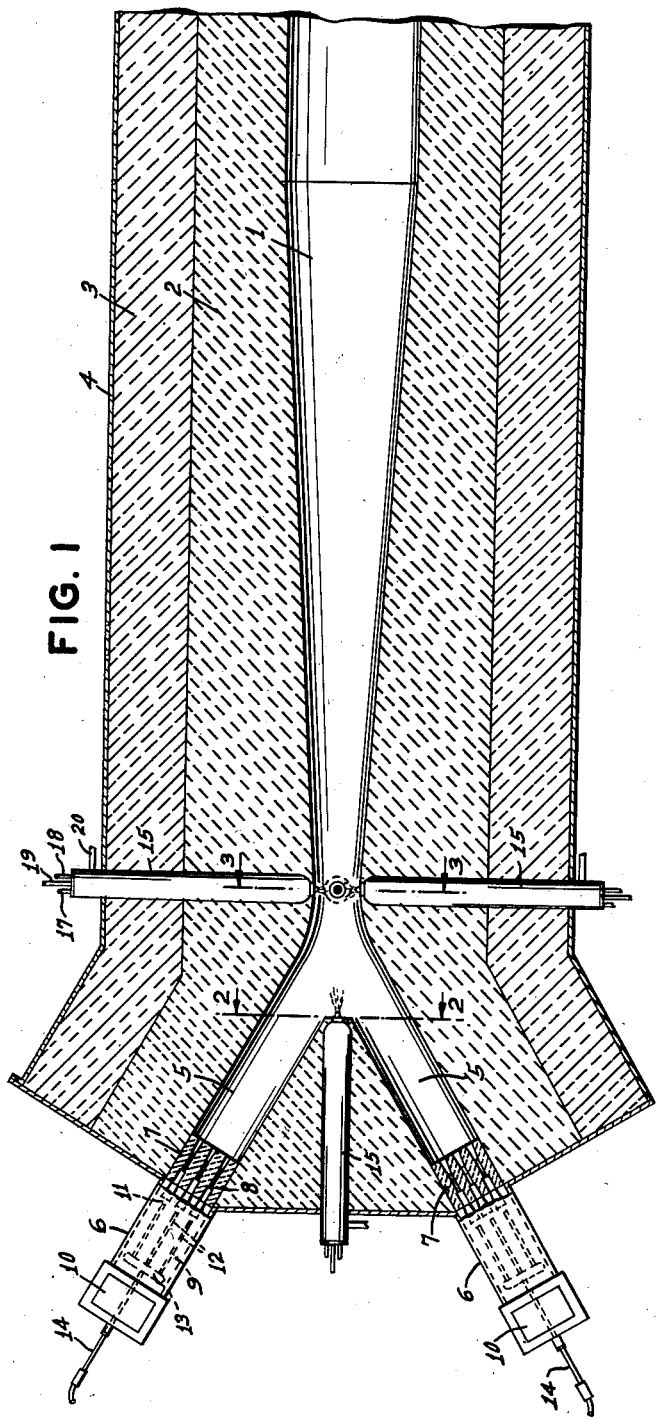
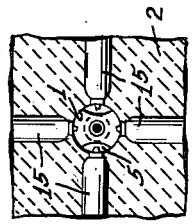
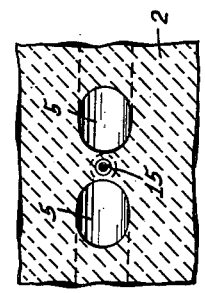
INVENTOR
George L. Heller
BY
Bauer, Edmonds, Morton, Barrows + Taylor.
ATTORNEYS Nov. 6, 1956
G. L. HELLER
2,769,692
CARBON BLACK PROCESS AND APPARATUS
Filed May 6, 1952
2 Sheets-Sheet 2
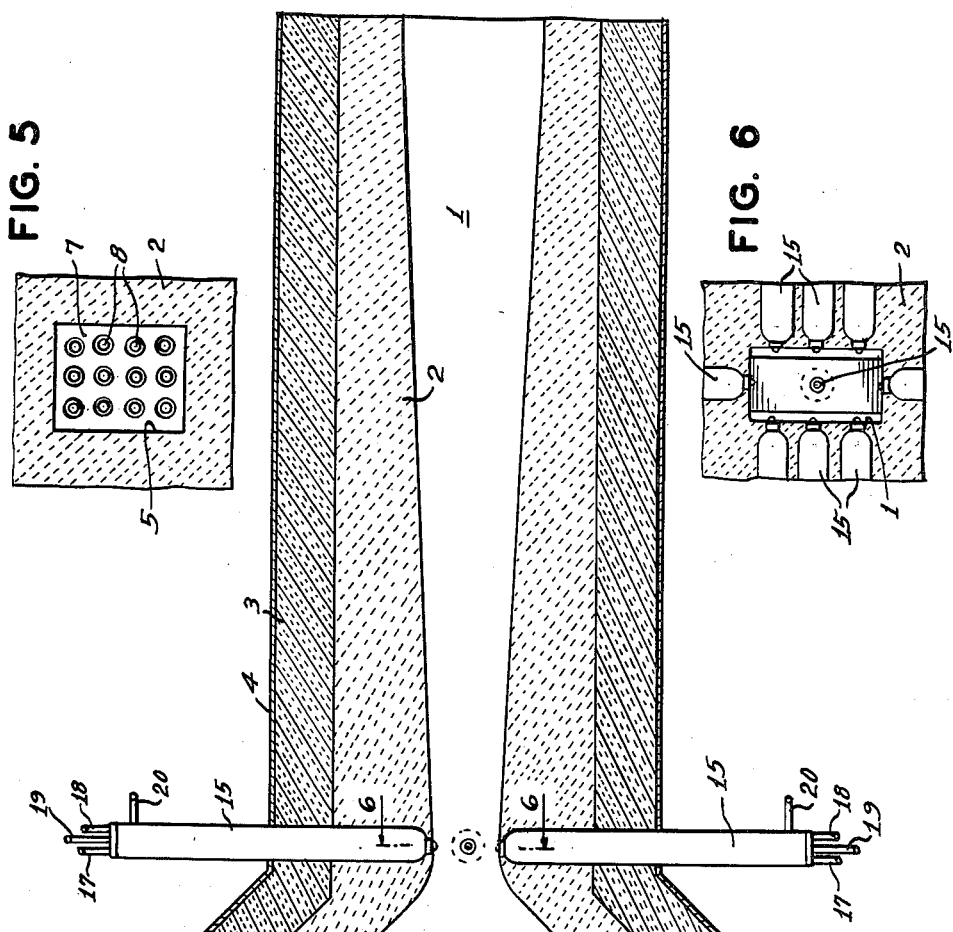
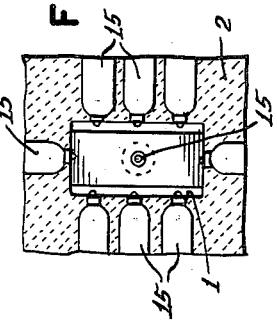
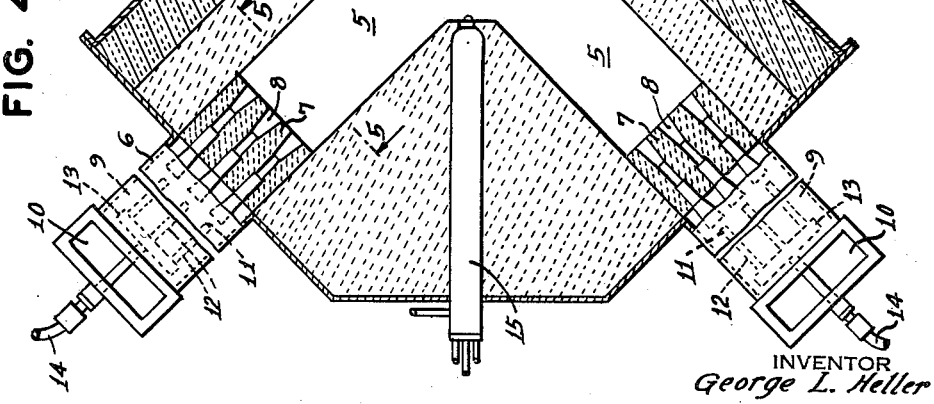
INVENTOR
George L. Heller
BY
Pennie, Edmonds, Morton, Barrows & Taylor
ATTORNEYS

United States Patent Office 2,769,692
Patented Nov. 6, 1956

2,769,692

CARBON BLACK PROCESS AND APPARATUS

George L. Heller, Monroe, La., assignor to Columbian Carbon Company, New York, N. Y., a corporation of Delaware Application May 6, 1952, Serial No. 286,370

10 Claims. (Cl. 23—209.4)

The present invention relates to the production of furnace blacks by the decomposition of hydrocarbons and, more particularly, to a furnace black process of the type in which the hydrocarbon is decomposed by rapidly mixing it with a stream of hot gases passing through an elongated, heat insulated reaction chamber. An operation of that type is described, for instance, in the Wiegand and Braendle Patent No. 2,378,055. The invention also provides improved apparatus especially adapted to the carrying out of the process.

In the process described in the patent just noted, the hydrocarbon to be decomposed, hereinafter referred to as hydrocarbon make, is injected into a separately generated, turbulent stream of hot blast flame gases, flowing through an elongated, heat insulated reaction chamber of substantially uniform cross-sectional area so that the hydrocarbon make is rapidly mixed with the blast flame gases and quickly and uniformly heated to its decomposition temperature and decomposed by heat absorbed therefrom. The resultant gaseous mixture continues through the reaction chamber in a state of high turbulence and the gaseous mixture, with carbon black suspended therein, is passed from the downstream end of the chamber, cooled, and the carbon black separated and collected.

It has been found in operations of the type described that the character of the resultant carbon black is materially affected by the rapidity and uniformity of the mixing of the hydrocarbon make with the hot blast flame gases. Notably, the particle size and rubber compounding characteristics of the resultant carbon black are materially affected thereby. Generally, the more rapid and thorough the mixing, the smaller the carbon black particles.

Due to the high velocity and high turbulence of the blast flame gases, the mixing of the hydrocarbon make therewith is generally so rapid that it might well be designated instantaneous. However, the rate of pyrolysis of the hydrocarbon make upon contact with the hot blast flame gases is, likewise, very rapid and generally increases with an increase in temperature and in the length of the molecular chain of the hydrocarbon. The time factors involved in the mixing and initiation of the pyrolysis appear to be measurable in micro-seconds.

The use of heavier, normally liquid hydrocarbons as raw materials for producing carbon black has become increasingly important. Most heavier hydrocarbons available for that purpose, for instance, heavy, relatively low cost residuum, cannot be vaporized without excessive cracking, and therefore their use has required that they be injected into the reaction chamber in liquid form. Where so used, the difficulty of uniformly dispersing the hydrocarbons in the hot gases is greatly increased and this is further complicated by their rapid decomposition rate.

Since it is generally desirable that the hydrocarbon make be thoroughly dispersed in the hot gases before pyrolysis has progressed to the point where carbon particles are formed, the rate of uniform mixing becomes increasingly important where higher molecular weight hydrocarbons are used as the make, as distinguished from natural gas, which consists principally of methane. Various methods have been proposed to promote the more rapid and uniform mixing of these heavier hydrocarbons with the blast flame gases.

It is a purpose of the present invention further to reduce the time interval between initial contact of the hydrocarbon make with the hot gases and the uniform, thorough dispersion of the hydrocarbon make therein. This is accomplished in accordance with my present invention by greatly increasing the turbulence of the blast flame gases in the zone of the chamber into which the hydrocarbon make is injected, i. e., the mixing zone, by bringing together in said zone separate streams of hot blast flame gases so that these streams meet with considerable impact, but without serious loss in kinetic energy of motion longitudinally through the chamber.

In accordance with a particularly advantageous aspect of the invention, I separately generate two or more high velocity, highly turbulent streams of the hot blast flame gases in separate, somewhat elongated combustion chambers and pass the resultant gases as separate, symmetrically positioned streams into the upstream end of the reaction chamber, the streams converging toward each other and toward the axis of the chamber in a generally downstream direction, and separately inject the hydrocarbon make into the resultant zone of increased turbulence and impact. I may inject the hydrocarbon make into the mixing zone as one or more streams in a direction substantially parallel to the longitudinal axis of the reaction chamber, or I may, with advantage, inject it into the mixing zone as one or more separate streams entering the chamber at substantially right angles to the longitudinal axis thereof.

The reaction chamber itself may be of substantially uniform cross-section throughout, but it is more advantageously somewhat reduced in transverse section at the zone of make gas injection, as more fully described and claimed in my copending application Ser. No. 243,019, filed August 22, 1951, or just downstream from the mixing zone. Further, the reaction chamber may be of generally circular cross-section or may be of rectangular cross-section. Usually, where a reaction chamber of circular cross-section is employed, two or more converging streams of blast flame gases symmetrically positioned with respect to the longitudinal axis of the chamber and converging toward the said axis in a generally downstream direction, may be used with advantage. Where a rectangular chamber of greater height than width is used one or more pair of oppositely positioned blast gas streams uniformly positioned with respect to, or uniformly spaced over, the height of the reaction chamber may be used.

By reason of the impact of the entering converging streams of hot blast flame gases, turbulence in the zone of mixing is intensified. However, in operations of the type described, it is important that a high degree of turbulence be maintained throughout the reaction chamber and, for that reason, excessive dissipation of the kinetic energy of the hot gas streams in the mixing zone should be avoided.

I have found that adequate impact to effect the desired degree of turbulence is attained where the angle of convergence of the separate streams is 60° or more. But, in order that the kinetic energy of the entering hot gas streams be largely retained, the angle formed by the longitudinal axis of the separate streams or combustion chambers with the upstream extension of the longitudinal axis of the reaction chamber should not exceed about 60°. In other words, the angle of convergence of the entering pairs of streams of blast flame gases, symmetrically positioned with respect to the longitudinal axis of the reaction chamber, should not be less than 60°, nor greater than 120°.

The invention in its broader aspect is not restricted with respect to the method and means by which the separate streams of hot blast flame gases are generated, nor the ratios in which the combustible gas and the oxygen-containing gas are present in the combustible mixture used, e. g., the blast gases may be oxidizing, neutral or reducing. It is important, of course, that these streams of hot gases be at a temperature in excess of that at which the hydrocarbon make is decomposed to carbon black and that the separate streams be supplied to the reaction chamber at relatively high velocities.

In the usual operation of the process of the Wiegand and Braendle Patent No. 2,378,055, a large amount of heat is radiated from the combustion zone to the cooler, downstream end of the furnace chamber. This is avoided in accordance with my present invention by so positioning the combustion chambers that each chamber is directed toward a side wall of the other combustion chamber of the pair, or an extension of that wall, which is heated to incandescence and serves to radiate or reflect heat to the combustion chamber. By this means the efficiency and rate of combustion and therefore the velocity and temperature of the gases supplied to the mixing zone may be materially increased.

The invention is applicable to the use of various types of hydrocarbon make, including normally gaseous hydrocarbons, natural gas, for instance, and hydrocarbon gases enriched by mixing therewith vapors of normally liquid hydrocarbons, particularly where furnace black of extremely small particle size is desired. It is, however, especially advantageous where a heavy, normally liquid make is used, the hydrocarbon make being injected into the mixing zone as a liquid spray. In the latter case, the liquid hydrocarbon make may, with advantage, be injected into the reaction chamber by means of spray nozzles such as disclosed and claimed in my copending applications Ser. No. 195,529 and Ser. No. 195,530, filed November 14, 1950, and which have since issued as U. S. Patents 2,659,662 and 2,659,663, respectively.

The invention will be further described and illustrated with reference to the accompanying drawings which represent conventionally, and somewhat diagrammatically and fragmentarily, apparatus especially adapted to the carrying out of the process. It will be understood, however, that the invention is not restricted to the particular embodiment thereof described.

In the drawings,

Figure 1 is a longitudinal, horizontal sectional view of the apparatus in which the combustion chambers and the reaction chamber are of circular cross-section.

Figure 2 is a fragmentary, transverse, sectional view along the lines 2—2 of Figure 1.

Figure 3 is a fragmentary, transverse sectional view along the lines 3—3 of Figure 1.

Figure 4 is a longitudinal, horizontal sectional view of the apparatus in which the combustion chambers and the reaction chamber are of rectangular cross-section.

Figure 5 is a fragmentary, transverse sectional view along the lines 5—5 of Figure 4, and Figure 6 is a fragmentary, transverse sectional view along the lines 6—6 of Figure 4.

In referring to these drawings, corresponding elements will be marked with like reference numerals.

Referring to Figures 1, 2 and 3 of the drawings, an elongated reaction chamber of circular cross-section is indicated at 1 and is lined and delineated by furnace refractory 2 covered by a layer of heat-insulating material 3, all encased in an outer metal casing 4. Positioned at the upstream end of the reaction chamber, there are two combustion chambers 5 of circular cross-section converging at an angle of about 60° toward the longitudinal axis of the reaction chamber. These combustion chambers are also lined with furnace refractory adapted to withstand high temperatures which, in turn, is covered by a layer of heat-insulating material enclosed in an outer metal casing.

At the outer end of each combustion chamber, there is provided a blast burner 6 comprising a burner block 7 of highly refractory material positioned in the outer end of the combustion chamber and having a number of burner ports 8 extending through the burner block. These burner ports are uniformly spaced over the transverse area of the burner block and open at their outer end into windbox 9 to which air for combustion is supplied under pressure through opening 10 from any convenient source such, for instance, as a blower. Coaxially positioned with respect to each burner port, there is a fuel jet 11 connected by means of tubes 12 to the fuel manifold 13 to which fuel, natural gas, for instance, is supplied under pressure through conduit 14.

Blast burners of the type indicated in the drawing, and which are more fully described and claimed in United States Letters Patent No. 2,529,873 have been found particularly suited for my present purpose, but it will be understood that other types of burners adapted to supply a high velocity, highly turbulent stream of hot blast flame gases may be used. Burners of the premixed type may be used, for instance.

In the apparatus shown, provision is made for supplying only two streams of hot combustion gases to the reaction chamber. It will be understood, however, that more than two such gas streams may be used. For instance, in the apparatus described, three such combustion chambers may be provided spaced apart at angles of 120°, or four such combustion chambers spaced apart at 90° angles may be employed. It is generally advantageous that the combustion chambers be symmetrically positioned with respect to the longitudinal axis of the reaction chamber in order to give a more uniform flow through the chamber.

The converging streams of hot gases may be otherwise generated and passed into the mixing zone of the reaction chamber through converging ducts positioned similarly to the combustion chambers shown, providing the hot gases be supplied at the required high temperature and that the separate streams be supplied under conditions of high velocity and turbulence.

As previously described, the converging streams of hot gases meet with such impact as to create exceptionally violently turbulent conditions. The hydrocarbon make may be injected into the resultant zone of extreme turbulence in a direction generally parallel to the longitudinal axis of the reaction chamber through the injector 15. Alternatively, the hydrocarbon make may be injected radially into the zone of extreme turbulence through a plurality of radially directed injectors 15, four such injectors being shown in the drawing.

The injectors 15 may take the form of a simple open-ended tube constructed of heat resistant material. This type of injector may be used with advantage where the hydrocarbon make is injected as a gas or vapor. However, where a heavy normally liquid hydrocarbon make is used, the elements 15 advantageously take the form of atomizing spray nozzles, such for instance as described in my application Serial No. 195,529, as represented in the drawing.

As more fully described in said application, these spray nozzles are, with advantage, water cooled, the hydrocarbon make being introduced through line 17, a gaseous medium for atomizing the oil, air, or steam, for instance, being introduced through line 18 and water for cooling the nozzle being introduced through line 19 circulated through the nozzle jacket and withdrawn through line 20.

Where desired, a portion of the hydrocarbon make may be injected through the longitudinal injector 15 and a further portion injected through the radial injectors 15 or either one of the means of injecting the hydrocarbon may be used to the exclusion of the other.

In the apparatus just described the elongated reaction chamber is somewhat reduced in cross-sectional area at a zone toward the upstream end of the chamber, the primary purpose of this being further to increase the velocity and turbulence of the stream of hot gases passing therethrough. This gas acceleration zone is particularly advantageous where a liquid hydrocarbon make is radially injected into the chamber through radially positioned spray nozzles 15. As previously noted, however, the reaction and mixing chamber may be of substantially uniform cross-sectional area throughout.

Though furnaces of the type just described, having combustion and reaction chambers of circular cross-section, have been used with advantage, I have found even more advantageous, especially in large scale installations, furnaces in which the combustion and reaction chambers are of rectangular cross-section, as more particularly represented by Figures 4, 5, and 6 of the drawings.

In this preferred apparatus, the reaction chamber 1 and the combustion chambers 5 are of rectangular cross-section, advantageously having a vertical dimension of the order of twice the horizontal dimension, as more clearly shown in Figures 5 and 6. The blast burners are substantially the same as those previously described, except that the burner blocks 7 are of rectangular section. The height of the combustion chambers is, in the apparatus shown, substantially equal to the height of the reaction chamber but, as previously indicated, a plurality of pairs of combustion chambers uniformly spaced over the height of the reaction chamber, may be used, if desired.

The reaction chamber is of substantially uniform height throughout but is reduced in width at its upstream end, as indicated. Advantageously, the maximum width of the reaction chamber is about one foot and the minimum width about six inches or somewhat less.

As appears more clearly from Figure 6, the hydrocarbon make injectors are uniformly spaced over the height of the reaction chamber on opposite sides thereof and two additional injectors are vertically positioned so as to direct the hydrocarbon make as opposing streams downwardly and upwardly respectively into the blast gas stream. Either the horizontal or the vertical injectors may be used, or all of these injectors may be used simultaneously. However, I have, with particular advantage, introduced the hydrocarbon make into the turbulent blast gas streams using only the upper and lower vertical injectors so that the make is injected across the maximum dimension of the chamber and the chances of a make stream striking the opposite wall is reduced.

Where the transverse area of the reaction chamber is reduced at or near its upstream end, as shown in the drawings, it is important that certain conditions with respect to the reduced section should be carefully observed. From the upstream end, there should be a curved approach to the gas acceleration zone so as to produce a smooth gas flow pattern to reduce frictional losses and avoid eddy currents. Any abrupt change in direction of flow through the chamber, or any sharp edges in the inner chamber wall at the zone of make injection will tend to cause eddies in the make injection zone and result in localized coke formation on the walls. These precautions should be observed even when the reaction chamber is of substantially uniform cross-section throughout.

As previously noted, the downstream flare of the reaction chamber is not an essential feature of the invention. It is, however, an advantageous means of reducing the furnace length while retaining the desirable time factor and an advantageous means of recovering the pressure drop from the velocity head built up in the throat zone of the chamber.

This velocity acceleration zone, where used, may extend any desired distance downstream. In approaching this zone, it is desirable that the inward slope or taper of the chamber walls form with the longitudinal axis of the chamber an angle not materially exceeding 11° and that the outward slope of the chamber walls be even more gradual, forming an agle with said longitudinal axis not exceeding about 4°. The extent of the reduction in transverse area is subject to variation depending primarily upon permissible back pressure and the desired velocity increase.

The gas acceleration zone, constructed in the manner described, at or just beyond the zone of initial impact between the make and the hot blast gases may, as previously noted, be employed with advantage in conjunction with the previously described converging streams of blast flame gases and cooperates therewith to form a zone of even greater velocity and turbulence, thus further promoting the speed and uniformity of the mixing.

The relative transverse areas of the converging streams of hot gases with respect to the transverse area of the mixing zone or reaction chamber, is likewise subject to variation, the optimum area relationship depending primarily upon the number of converging streams, permissible back pressure, and the desired linear velocity of the composite gas stream through the remainder of the reaction chamber, the latter materially affecting the period of time during which the hydrocarbon make, or carbon particles resulting therefrom, are in contact with the hot gases.

It is generally desirable that the summation of the transverse areas of the converging streams of hot gases be at least equal to the transverse area of the reaction chamber, where the latter chamber is of substantially uniform cross-sectional area throughout, or at least equal to the maximum transverse area of the reaction chamber, where apparatus such as illustrated in the drawings is employed. Where the resultant back pressure can be tolerated and where extremely high linear velocities through the reaction chamber are desired, the summation of the transverse areas of the converging streams of hot gases may greatly exceed the transverse area of the reaction chamber.

In operation, the hot blast flame gases generated in combustion chambers 5 are passed at high velocity into the upstream end of the combustion chamber and meet with great impact, thereby creating a zone of terrific turbulence. The temperature of the hot gas streams is subject to considerable variation depending upon the type of hydrocarbon to be decomposed and the desired characteristics of the product. Normally, these gas streams will range in temperature from about 2,000° F. to about 3,000° F. and, consequently, it is important that the inner walls of the combustion chambers and of the reaction chamber be of highly refractory material, advantageously, alumina, Mullite, or the like.

In operations comprising a single combustion zone such as shown, for instance, in the Heller Patent No. 2,529,873, when the blast velocity exceeds 80 to 125 feet per second, there is frequently observed a decrease in the temperature of the resultant blast flame gases, apparently due to incomplete combustion. Where this velocity is increased to above 200 feet per second, the flame becomes unsteady and there is a tendency to blow the flame away from the face of the burner block. The obtainable velocity of the blast flame gases in the zone of mixing with the hydrocarbon make has been subject to these practical limitations.

In accordance with my present invention, the velocities previously impractical to obtain may be readily obtained under optimum combustion conditions.

As previously noted, it is usually desirable, particularly where a liquid hydrocarbon make is used, to inject the make as an atomized spray into the accelerated zone of the furnace chamber in a direction perpendicular to its longitudinal axis. Advantageously, the spray nozzles are positioned directly opposite one another, as this has been found to promote uniformity of mixing.

My improved apparatus provides means whereby the hydrocarbon make is extremely rapidly and uniformly mixed with the hot blast flame gases and converted to finely divided colloidal carbon, even when the hydrocarbon make is a heavy liquid, such, for instance, as the highly aromatic oils obtained from the residue resulting from the thermal cracking of a catalytic cycle stock. A liquid hydrocarbon of the type just described characterized by an API gravity of 0±6 and a pour point below 80° F. has been used with particular advantage.

The dimensions and relative dimensions of my improved apparatus are, as previously indicated, subject to considerable variation. One apparatus which I have used with particular advantage comprised two combustion chambers substantially as illustrated in Figures 4, 5 and 6 of the drawing, each combustion chamber being 5 inches wide, 6 inches high and 1 foot 9 inches long. These combustion chambers discharged into a reaction chamber substantially as shown in the drawing, the gas acceleration section of which was 4 inches wide, and 6 inches high and the length of the chamber from said section to the point of discharge from the reaction chamber being 6 feet. The hydrocarbon make was introduced longitudinally, as indicated in drawing at 15, at a point 1 foot from the gas acceleration section. Velocities achieved in the gas acceleration section were 2½ times the normal blast gas velocities obtained in rectangular chambers of the conventional type.

In the apparatus just described, using a gaseous hydrocarbon, I have produced carbon blacks having a particle size within the range of 20–25 millimicrons or less, a color number within the range of 157–170 and exceptionally high tensile strength characteristics in rubber compositions.

By reason of the extreme turbulence in the mixing zone, the hydrocarbon make is extremely rapidly and uniformly mixed with the hot gases and is decomposed by heat absorbed therefrom, the resultant mixture continuing through the reaction chamber in a state of high turbulence.

Where the hydrocarbon make is introduced as a liquid spray, the liquid droplets appear to be substantially instantaneously shattered, or torn apart, by the extreme turbulence of the hot gases and dispersed in the hot gases in most minute particles. By reason of this more rapid dispersion, furnace carbons of extremely high color, a characteristic indicative of small particle size, may be produced even from heavy residual hydrocarbon fractions.

The process of the invention and the advantages derived therefrom when a heavy liquid make is used will be illustrated by the following specific example of an operation carried on in apparatus as represented by Figures 4 to 6, inclusive, of the drawings, in which the maximum width of the reaction chamber was 11½ inches and the width of the gas acceleration zone of the chamber was 4½ inches, the width of the two combustion chambers being 11½ inches and the height of the combustion chambers and reaction chamber being approximately 8½ inches. In this apparatus, the length of the combustion chambers was approximately 2 feet and the length of the reaction chamber approximately 9 feet.

In this operation, air was charged to the blast burners at the rate of 50,000 cubic feet per hour and natural gas was charged to the burners at a rate of 4,380 feet per hour, the blast gas ratio, air to natural gas, being approximately 11.4. Using only the vertically positioned hydrocarbon make injectors at the throat of the reaction chamber, a heavy residue oil of the type previously described was introduced as a spray into the hot blast flame gases at a rate of 35.3 gallons per hour. The temperature of the blast flame gases just before mixing ($T_1$) was 2,920° F. and at a point ($T_2$) just beyond the make injection zone of the furnace, the temperature was 2,120° F., the gases being discharged from the reaction chamber at a temperature of 2,470° F. ($T_5$). By this reaction, there was produced 3.81 pounds of carbon black per gallon of oil having an ABC color number of 134, a tinting strength of 124, as compared to 113 for rubber grade channel black, and an oil absorption value of 19.8 gallons per 100 pounds of the black.

In a similar operation in which the blast flame gases just before mixing had a temperature of 2,700° F., just downstream from the mixing zone were 1,830° F., and passed from the reaction chamber at a temperature of 2,340° F., the hydrocarbon oil was injected into the blast flame gases at a rate of 58.6 gallons per hour and there was produced 4.15 pounds of carbon black per gallon of oil, having an ABC color number of 117, a tinting strength of 110, and an oil absorption value of 16.0 gallons per 100 pounds of carbon black.

From the foregoing examples, it is apparent that, by variations in operating conditions, primarily the rate of oil feed, the characteristics and yields of the resultant carbon black may be varied considerably.

The operating conditions generally may be varied over a considerable range. For instance, in apparatus of the size just described, the rate at which air for combustion is supplied may be varied from 40,000 to 70,000 cubic feet per hour and the ratio of air to fuel gas may be varied within the range of 9:1 to 14:1. Where a carbon black of very small particle size is desired, the rate at which oil is supplied to the system should be within the range of about 0.7 to 1.4 gallons per thousand cubic feet of air, but where a carbon black of somewhat larger particle size is desired, the rate at which the hydrocarbon oil is supplied to the system may be increased to two gallons per thousand cubic feet of air, or even higher.

In still further operations of the type just described using the same type of heavy oil, and the operating conditions indicated in the following tabulation, HAF type black in the indicated yields was obtained:

| Run No. | A | B |
|---|---|---|
| Air, cu./ft. per hour | 40,000 | 50,000 |
| Fuel gas, cu./ft. per hour | 4,550 | 5,550 |
| Oil rate, gals. per hour | 27.2 | 35.9 |
| Temperature, ° F.: | | |
| $T_1$ left | 2,610 | 2,600 |
| $T_1$ right | 2,690 | 2,670 |
| $T_2$ | 2,180 | 2,160 |
| $T_5$ | 2,720 | 2,660 |
| Yield, lbs. per gal. of oil | 4.27 | 4.02 |
| ABC color number | 103 | 107 |
| Tinting strength, percent statex B | 103 | 100 |
| Oil absorption, gals. per 100 lbs | 19.7 | 19.9 |

I claim:

1. In the process for producing carbon black by the thermal decomposition of hydrocarbons wherein the hydrocarbon is separately injected into and is rapidly and uniformly mixed with a turbulent stream of hot flame gases passing through an elongated reaction chamber and decomposed by heat absorbed from the hot gases to form carbon black in suspension, the resultant suspension being withdrawn from the downstream end of the reaction chamber, cooled and the carbon black collected, the steps comprising supplying the hot blast flame gases to the reaction chamber as from without the chamber as a plurality of separate high velocity streams, the longitudinal axis of each stream lying in the plane of the longitudinal axis of the chamber and said streams converging toward each other and toward the longitudinal axis of the chamber in a generally downstream direction, the angle of convergence of said separate streams toward each other being within the range of 60° to 120°, and thereby impinging each of said streams upon a like stream as they enter the chamber to form within the chamber a zone of impact and increased turbulence and injecting the hydrocarbon to be decomposed into the said zone to effect rapid and uniform mixing of the hydrocarbon make with the hot gases and passing the resultant mixture in a state of violent turbulence through the elongated reaction chamber.

2. The process of claim 1 in which the respective streams of hot blast flame gases are separately generated in separate elongated combustion chambers, the longitudinal axis of the respective combustion chambers being at an angle at least 30° but not exceeding 60° from the upstream extension of the longitudinal axis of the reaction chamber, and symmetrically positioned about said extended axis.

3. The process of claim 1 in which the hydrocarbon make is a normally liquid hydrocarbon and is injected into the reaction chamber as a finely divided liquid spray.

4. The process of claim 1 in which the hydrocarbon make is injected into the upstream end of the reaction chamber in a direction generally parallel to the longitudinal axis of the chamber.

5. The process of claim 1 in which the elongated reaction chamber is gradually reduced in transverse area at a zone thereof immediately downstream from the zone of initial impact of the converging gas streams to create a zone of increased velocity and turbulence and the hydrocarbon make is injected into the last said zone in a direction substantially perpendicular to the longitudinal axis of the chamber.

6. The process of claim 1 in which the elongated reaction chamber is of rectangular cross-section of greater height than width and is reduced in width at a zone thereof immediately downstream from the zone of initial impact of the converging gas streams to create a zone of increased velocity and turbulence of the gas stream and the hydrocarbon make is injected into the last said zone as opposing streams directed from above and below across the greater transverse dimension of said zone.

7. Apparatus for the production of furnace carbons comprising an elongated heat insulated reaction chamber, a plurality of combustion chambers leading into the upstream end of the reaction chamber from opposite sides of said chamber, the longitudinal axis of each of the respective combustion chambers lying in the plane of the longitudinal axis of the reaction chamber and forming an angle of at least 30° but not exceeding 60° with the upstream extension of the longitudinal axis of the reaction chamber, and means for separately injecting hydrocarbon to be decomposed into the upstream end of the reaction chamber at a point near the entrance of the combustion chambers.

8. Apparatus for the production of furnace carbons comprising an elongated, heat-insulated reaction chamber, a plurality of combustion chambers leading into the upstream end of the reaction chamber from opposite sides of said chamber, the longitudinal axis of each of the respective combustion chambers lying in the plane of the longitudinal axis of the reaction chamber and forming an angle of at least 30° but not exceeding 60° with the upstream extension of the longitudinal axis of the reaction chamber, and means for separately injecting hydrocarbon to be decomposed, in a longitudinal direction into the upstream end of the reaction chamber near the entrance of the combustion chambers thereto and symmetrically positioned with respect to the longitudinal axis of the combustion chambers.

9. The apparatus of claim 7 further characterized by the fact that the elongated reaction chamber is so constructed as to form a restricted cross-section of the reaction chamber located in the upstream end of the reaction chamber and immediately downstream from the entrance of the converging combustion chambers and means for the injection of the hydrocarbon into said restricted cross-section in a direction substantially perpendicular to the longitudinal axis of the chamber.

10. Apparatus for the production of furnace carbons comprising an elongated heat-insulated reaction chamber of rectangular cross-section and of greater height than width, a plurality of combustion chambers leading into the upstream end of the reaction chamber from opposite sides of said chamber, the longitudinal axis of each of the respective combustion chambers lying in the plane of the longitudinal axis of the chamber and forming an angle of at least 30° but not exceeding 60° with the upstream extension of the longitudinal axis of the reaction chamber, the furnace chamber being reduced in width at a zone in its upstream end immediately downstream from the entrance of the converging combustion chambers and opposing vertically positioned spray nozzles positioned in the upper and lower furnace walls at the zone thereof of reduced width and adapted to inject sprays of liquid hydrocarbon into said zone.

References Cited in the file of this patent

UNITED STATES PATENTS

| Number | Name | Date |
|---|---|---|
| 1,163,333 | Galbraith et al. | Dec. 7, 1915 |
| 1,448,655 | Darrah | Mar. 13, 1923 |
| 1,801,431 | Irish | Apr. 21, 1931 |
| 1,981,150 | Pyzel | Nov. 20, 1934 |
| 2,129,269 | Furlong | Sept. 6, 1938 |
| 2,140,316 | Furlong | Dec. 13, 1938 |
| 2,217,649 | Goddard | Oct. 8, 1940 |
| 2,368,827 | Hanson et al. | Feb. 6, 1945 |
| 2,375,795 | Krejci | May 15, 1945 |
| 2,440,423 | Weigand et al. | Apr. 27, 1948 |
| 2,499,437 | Wiegand et al. | Mar. 7, 1950 |
| 2,499,438 | Wiegand et al. | Mar. 7, 1950 |
| 2,597,232 | Eckholm et al. | May 20, 1952 |
| 2,597,233 | Eckholm et al. | May 20, 1952 |
| 2,599,981 | Eckholm | June 10, 1952 |
| 2,616,795 | Krejci | Nov. 4, 1952 |
| 2,659,662 | Heller | Nov. 17, 1953 |
| 2,664,402 | Cromeans | Dec. 29, 1953 |

FOREIGN PATENTS

| 633,667 | Germany | Aug. 3, 1936 |